United States Patent
Nakagawa

(10) Patent No.: US 7,420,696 B2
(45) Date of Patent: Sep. 2, 2008

(54) JOB MANAGEMENT APPARATUS, JOB MANAGEMENT SYSTEM, JOB MANAGEMENT METHOD, AND STORAGE MEDIUM STORING PROGRAM

(75) Inventor: Isamu Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1099 days.

(21) Appl. No.: 10/410,344

(22) Filed: Apr. 10, 2003

(65) Prior Publication Data
US 2003/0193689 A1 Oct. 16, 2003

(30) Foreign Application Priority Data

| Apr. 12, 2002 | (JP) | .............. 2002-110683 |
| Apr. 2, 2003 | (JP) | .............. 2003-099304 |

(51) Int. Cl.
*G06F 3/12* (2006.01)
*G06F 15/00* (2006.01)

(52) U.S. Cl. ..................... 358/1.15; 358/1.13

(58) Field of Classification Search .................. 358/1.1, 358/1.9, 1.11–1.18, 1.2, 1.5, 405, 407, 468; 399/8, 9, 10; 347/2, 3, 5
See application file for complete search history.

(56) References Cited

U.S. PATENT DOCUMENTS

| 6,469,796 B1 * | 10/2002 | Leiman et al. ............. 358/1.15 |
| 6,894,792 B1 * | 5/2005 | Abe ......................... 358/1.15 |
| 7,154,620 B1 * | 12/2006 | Ogura et al. ............... 358/1.15 |

FOREIGN PATENT DOCUMENTS

| JP | 08-305520 | 11/1996 |
| JP | 2001-228991 | 8/2001 |
| JP | 2001-325083 | 11/2001 |
| JP | 2002-014791 | 1/2002 |
| JP | 2002-259103 | 9/2002 |

* cited by examiner

*Primary Examiner*—Dov Popovici
*Assistant Examiner*—Thierry L Pham
(74) *Attorney, Agent, or Firm*—Fitzpatrick, Cella, Harper & Scinto

(57) ABSTRACT

In the past, a computer that processes data and an output apparatus that receives the processed data and outputs the same have managed the data differently. Therefore, it has been difficult to correctly grasp job information. According to this invention, logs are obtained from both of a computer that processes data and an output apparatus that outputs the processed data and merged to be managed. Therefore, job information can be managed collectively and correctly.

19 Claims, 21 Drawing Sheets

FIG. 7

HOOK LOG

| JobId | 520 |
|---|---|
| APPLICATION NAME | Word MEIJIN |
| NUMBER OF LOGICAL PAGES | 9 |
| DOCUMENT NAME | abcd0001 |
| ORIGINAL DOCUMENT NAME | 2001 ANNUAL REPORT |
| PROCESSED ? | NO |
| TYPE | HOOK |
| START TIME | 2001/12/20 21:11 |
| END TIME | 2001/12/20 21:21 |

FIG. 8

DRIVER LOG

| JobId | 520 |
|---|---|
| PAPER SIZE | A4 |
| N-up | 4 |
| NUMBER OF PHYSICAL PAGES | 3 |
| DUPLEX OR SIMPLEX ? | DUPLEX |
| PROCESSED ? | NO |
| TYPE | DRIVER |
| START TIME | 2001/12/20 21:21 |
| END TIME | 2001/12/20 21:31 |

FIG. 9

API LOG

| JobId | 520 |
|---|---|
| OWNER NAME | YAMADA |
| SPOOL DATA SIZE | 56789 |
| NUMBER OF PHYSICAL PAGES | 3 |
| DUPLEX OR SIMPLEX ? | DUPLEX |
| PROCESSED ? | NO |
| TYPE | API |
| START TIME | 2001/12/20 21:31 |
| END TIME | 2001/12/20 21:41 |

FIG. 10

TRANSMISSION SECTION LOG

| JobId | 520 |
|---|---|
| PROCESSED ? | NO |
| TYPE | TRANSMISSION SECTION |
| START TIME | 2001/12/20 21:41 |
| END TIME | 2001/12/20 21:51 |

FIG. 12

MERGE LOG

| JobId | 520 |
|---|---|
| APPLICATION NAME | Word MEIJIN |
| NUMBER OF LOGICAL PAGES | 9 |
| DOCUMENT NAME | abcd0001 |
| ORIGINAL DOCUMENT NAME | 2001 ANNUAL REPORT |
| PROCESSED ? | NO |
| TYPE | MERGE |
| START TIME | 2001/12/20 21:11 |
| END TIME | 2001/12/20 21:21 |
| PAPER SIZE | A4 |
| N-up | 4 |
| NUMBER OF PHYSICAL PAGES | 3 |
| DUPLEX OR SIMPLEX ? | DUPLEX |
| OWNER NAME | YAMADA |
| SPOOL DATA SIZE | 56789 |

FIG. 13

APPARATUS LOG

| JobId | 520 |
|---|---|
| NUMBER OF PAGES OF SHEETS EJECTED | 3 |
| NUMBER OF SHEETS EJECTED | 2 |
| PROCESSED ? | NO |
| TYPE | TRANSMISSION SECTION |
| START TIME | 2001/12/20 22:01 |
| END TIME | 2001/12/20 22:11 |
| DOCUMENT NAME | abcd0001 |
| MODEL NAME | xyz |

FIG. 14

APPARATUS LOG (PRIOR ART)

| | |
|---|---|
| JobId | 520 |
| NUMBER OF PAGES OF SHEETS EJECTED | 3 |
| NUMBER OF SHEETS EJECTED | 2 |
| PROCESSED ? | NO |
| TYPE | TRANSMISSION SECTION |
| START TIME | 2001/12/20 22:01 |
| END TIME | 2001/12/20 22:11 |
| DOCUMENT NAME | 2001 ANNUAL |
| MODEL NAME | xyz |

FIG. 17

FINAL LOG

| JobId | 520 |
|---|---|
| APPLICATION NAME | Word MEIJIN |
| NUMBER OF LOGICAL PAGES | 9 |
| DOCUMENT NAME | 2001 ANNUAL REPORT |
| PROCESSED ? | NO |
| TYPE | MERGE |
| START TIME | 2001/12/20 21:11 |
| END TIME | 2001/12/20 21:21 |
| PAPER SIZE | A4 |
| N-up | 4 |
| NUMBER OF PHYSICAL PAGES | 3 |
| DUPLEX OR SIMPLEX ? | DUPLEX |
| OWNER NAME | YAMADA |
| SPOOL DATA SIZE | 56789 |
| NUMBER OF PAGES OF SHEETS EJECTED | 3 |
| NUMBER OF SHEETS EJECTED | 2 |
| MODEL NAME | xyz |

FIG. 21

FINAL LOG

| | |
|---|---|
| JobId | 520 |
| APPLICATION NAME | Word MEIJIN |
| NUMBER OF LOGICAL PAGES | 9 |
| DOCUMENT NAME | 2001 ANNUAL REPORT |
| PROCESSED ? | NO |
| TYPE | MERGE |
| START TIME | 2001/12/20 21:11 |
| END TIME | 2001/12/20 21:21 |
| PAPER SIZE | A4 |
| N-up | 4 |
| NUMBER OF PHYSICAL PAGES | 3 |
| DUPLEX OR SIMPLEX ? | DUPLEX |
| OWNER NAME | YAMADA |
| SPOOL DATA SIZE | 56789 |
| NUMBER OF PAGES OF SHEETS EJECTED | 3 |
| NUMBER OF SHEETS EJECTED | 2 |
| MODEL NAME | xyz |

FIG. 24

| JobId | 520 |
|---|---|
| PROCESSED ? | NO |
| TYPE | TRANSMISSION SECTION |
| START TIME | 2001/12/20 21:41 |
| END TIME | 2001/12/20 21:51 |
| CUSTOMER NAME | ABC DESIGN OFFICE |

FIG. 25

FINAL LOG WITH CUSTOMER NAME

| | |
|---|---|
| JobId | 520 |
| APPLICATION NAME | Word MEIJIN |
| NUMBER OF LOGICAL PAGES | 9 |
| DOCUMENT NAME | 2001 ANNUAL REPORT |
| PROCESSED ? | NO |
| TYPE | MERGE |
| START TIME | 2001/12/20 21:11 |
| END TIME | 2001/12/20 22:21 |
| PAPER SIZE | A4 |
| N-up | 4 |
| NUMBER OF PHYSICAL PAGES | 3 |
| DUPLEX OR SIMPLEX ? | DUPLEX |
| OWNER NAME | YAMADA |
| SPOOL DATA SIZE | 56789 |
| NUMBER OF PAGES OF SHEETS EJECTED | 3 |
| NUMBER OF SHEETS EJECTED | 2 |
| CUSTOMER NAME | ABC DESIGN OFFICE |

JOB MANAGEMENT APPARATUS, JOB MANAGEMENT SYSTEM, JOB MANAGEMENT METHOD, AND STORAGE MEDIUM STORING PROGRAM

BACKGROUND OF THE INVENTION

1. Field of the Invention

The present invention relates to a peripheral apparatus connected to a network, such as a printer, a scanner, a facsimile machine, a copier and a multifunction peripheral (MFP), and to a computer and a network system which manage such apparatus.

2. Related Background Art

Conventionally, there have been developed job management methods for image processing apparatus that obtain and manage many pieces of job information. For appropriate job management (job account), it is required to obtain information on a job performed in a peripheral apparatus. A conventional method for obtaining job information is as follows. That is, a spooler in a client computer stores data received from a driver and sequentially sends the data to a transmission section in the client computer. The transmission section in the client computer receives print data from the spooler and, if a printer is ready for operation, transmits job data to the device in accordance with a job transfer scheme implemented in the device. Well-known job data transfer schemes are the LPD protocol prescribed in RFC 1179 and Printer Job Language prescribed by the Hewlett-Packard Company in the United States. With Printer Job Language, a port monitor can obtain information including the number of pages concerning a completed job through two-way communication with the device. Of course, a closed proprietary job management method of a printer supplier may be used.

On the other hand, there has been devised a system that allows job information to be transmitted from a peripheral apparatus to a client computer in accordance with the job management method described above, thereby managing a job name or job ID.

In addition, there has been developed a technique of merging, for display, a job in a print server with job information in a host computer based on a job ID generated in a client in a printing system.

However, if the job information is obtained from one of the client which issues a job and the printing apparatus when the client and the printing apparatus obtain different job information, there arises a problem in that job information cannot be totally grasped.

For example, from the job information obtained in accordance with a job management method of the client computer, the document name managed in the client computer can be obtained, while the number of pages of sheets to be ejected cannot be obtained. On the other hand, from the job information obtained in accordance with a job management method of the printing apparatus, the number of pages of sheets to be ejected can be correctly obtained, while information including the document name cannot be obtained in many cases. In such cases, if the document name is essential and needs to be obtained from the job information, the job management method of the client computer has to be adopted. Then, it becomes impossible to obtain correctly the number of pages of sheets to be ejected.

In addition, an old document name, which is job identification information that can be supported by the client, cannot be supported by the printer because of the limit of the number of characters of the document name. Therefore, there is a problem in that, if the old document name is used as a key, the job log cannot be correctly managed.

SUMMARY OF THE INVENTION

The present invention has been devised in view of such circumstances. An object of this invention is to totally and correctly grasp information on a job of a computer and a peripheral apparatus.

Furthermore, in order to more correctly grasp utilization of a peripheral apparatus, another object of this invention is to provide a system that realizes correct obtainment of job information by obtaining job information from both a client computer and an image forming apparatus.

In order to attain at least one of the objects, this invention provides the following measures.

This invention provides a job management apparatus for managing a job which is subject to a data processing in a data processing apparatus and can be output from an image forming apparatus, comprising: first obtaining means for obtaining job information processed in the data processing apparatus; second obtaining means for obtaining job information provided by the image forming apparatus processing the job; and managing means for managing the job information obtained by the first obtaining means and the job information obtained by the second obtaining means by combining the two pieces of job information in accordance with one piece of job identification information.

Other features and advantageous of the present invention will be apparent from the following description taken in conjunction with the accompanying drawings, in which like reference characters designate the same or similar parts throughout thereof.

BRIEF DESCRIPTION OF THE DRAWINGS

FIG. 7 shows an example of a hook log according to an embodiment of this invention;

FIG. 8 shows an example of a driver log according to an embodiment of this invention;

FIG. 9 shows an example of an API log according to an embodiment of this invention;

FIG. 10 shows an example of a transmission section log according to an embodiment of this invention;

FIG. 12 shows an example of a merge log according to an embodiment of this invention;

FIG. 13 shows an example of an apparatus log according to an embodiment of this invention;

FIG. 14 shows an example of a conventional apparatus log;

FIG. 17 shows an example of the final log according to an embodiment of this invention;

FIG. 21 shows an example of a final log according to an embodiment of this invention;

FIG. 24 shows an example of a transmission section log having a customer name added thereto according to an embodiment of this invention; and FIG. 25 shows an example of a final log having a customer name added thereto according to an embodiment of this invention.

DESCRIPTION OF THE PREFERRED
EMBODIMENTS

First Embodiment

Now, an embodiment of this invention will be described in detail below with reference to the drawings.

Figure 18:
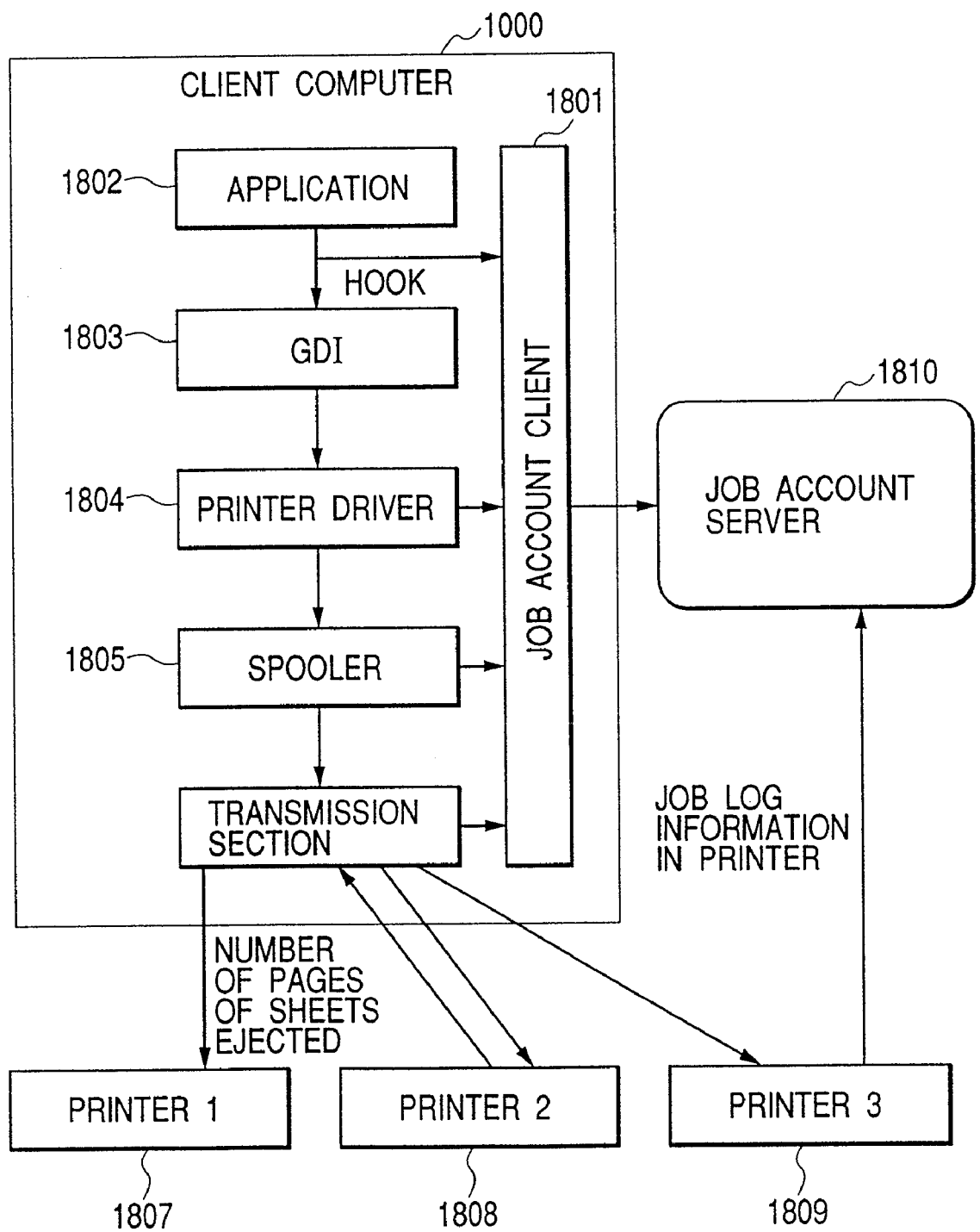
FIG. 18 shows an example of a system that is to be understood before implementing a job account system according to an embodiment of this invention.

FIG. 18 shows an example of a system that is to be understood before implementing a job account system according to the embodiment of this invention. Printers 1807 to 1809 included in the system shown in FIG. 18, each of which is a preferred example of an image forming apparatus of this invention, will be described. The printers operate variously depending on functions implemented therein. For example, the printer 1807, which is the commonest, prints data received from a transmission section of a client computer. The printer 1808 transmits the number of pages of ejected sheets of a job back to the transmission section of the client computer 100 when the job is completed. The printer 1809 stores job information in a storage device in the printer after printing.

The client computer shown in FIG. 18 performs printing in the following manner. That is, an application 1802 calls an application programming interface (API), thereby manipulating a GDI 1803 of an OS, which is a subsystem for processing graphics rendering. A printer driver 1804 converts a request from the GDI 1803 into a format suitable for a target printer and transmits this to a spooler 1805.

In the client computer 1000, a job account client 1801 hooks (monitors and recognizes) a GDI call from the application 1802. The job account client 1801 counts APIs for which a page break or paper ejection is conducted, thereby obtaining the number of ejected sheets or number of pages for a job issued by the application. The job information thus obtained is referred to as a hook log.

In addition, the job account client 1801 previously defines a protocol with the printer driver and communicates therewith, whereby it can receive job information from the printer driver in the client computer. The job information thus obtained is referred to as a driver log.

In addition, the job account client 1801 regularly monitors the spooler and, if there is a spooled job, obtains information on the job via the API, thereby obtaining the number of ejected sheets or number of pages for the job. The job information thus obtained is referred to as an API log.

In addition, the job account client 1801 defines a protocol with the transmission section and communicates therewith, thereby obtaining the total number of pages of ejected sheets returned from the printer. The job information thus obtained is referred to as a transmission section log.

Besides, in the case of a printer storing job information therein, for example, in the case of the printer 1809, which is a preferred example of the image forming apparatus, a job account server defines a protocol with the printer and communicates with the printer, thereby obtaining the job information therefrom. The job information thus obtained is referred to as an apparatus log. The apparatus log is stored in a RAM or HDD in the printer. However, in many cases, the information including a document name transmitted from the transmission section cannot be entirely stored because of the limited storage capacity. Here, besides the printer, the image forming apparatus may be a facsimile machine, copier, copy system incorporating printer and scanner features, which is a kind of copier, or combined machine thereof.

The job account client 1801 assigns priorities to the hook log, the driver log, the API log, the transmission section log and the apparatus log and transmits any of the logs to the job account server.

In response to a request from a person who wants viewing, the job account server 1810 selects a job log and conducts accumulation processing for each unit period, each device, each job issuer or the like.

Figure 1:
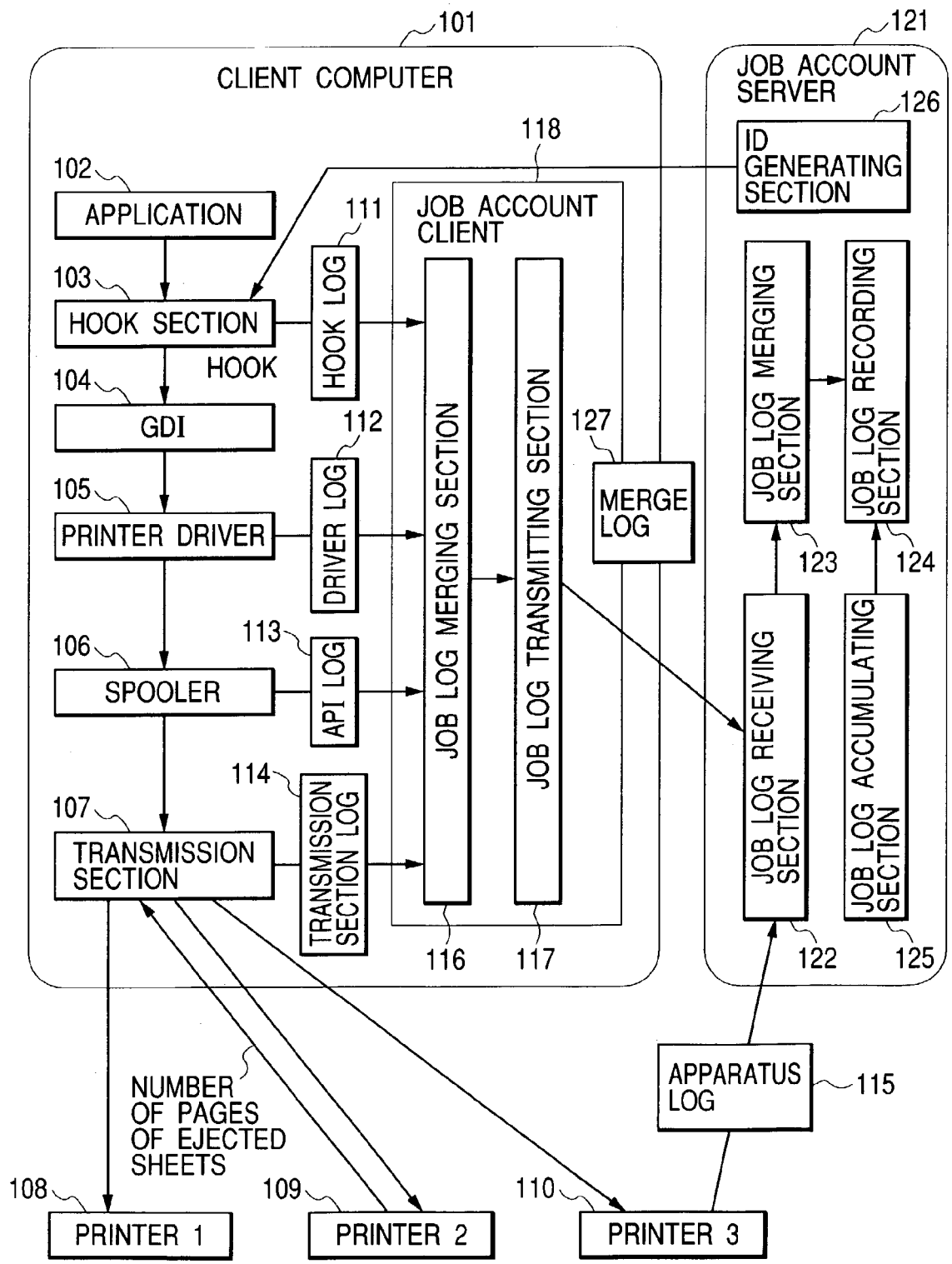
FIG. 1 shows a configuration of a job account system according to an embodiment of this invention.

FIG. 1 shows apparatus in the job account system according to the embodiment of this invention and a module configuration thereof. Here, this invention is implemented in a system comprising a plurality of apparatus. Furthermore, of course, this invention can be applied to a case where this invention can be implemented only after a program is provided to the system or apparatus. Creation of the four logs, that is, the hook log, the driver log, the API log and the transmission section log, for one print job will be described in detail. In the following, parts different from those in FIG. 18 will be described in detail.

Reference numeral 101 denotes a client computer constituted by a typical PC or workstation. When the client computer 101 is instructed by an application 102 to perform printing, it transmits print data to any of printers 107, 108 and 109 via a transmission section 107. A job account client 118, which is a software module that is executed by a CPU in the client computer, collects logs concerning various printing processings and transmits the collected logs to a job account server 121 via a job log transmitting section 117. In this transmission, the job log transmitting section, which is a part of the job account client, may control a transmitting section provided by an OS to transmit the logs to a job log receiving section.

In the client computer 101, when a print instruction is issued to the application 102, the application 102 conducts GDI call for rendering in the same manner described with reference to FIG. 18. A hook section 103, which is incorporated in the job account client 118, hooks the GDI calls and accumulates information on each call including a call parameter and the number of times thereof. A history created based on the information is referred to as a hook log 111. FIG. 7 shows an example of the hook log 111. The hook section 103 possibly changes the document name according to a prescribed criterion. The document name and the changing processing will be described later.

A printer driver 105 converts, in accordance with a print setting, the GDI call into print data capable of being interpreted by the printer and transmits the same to a spooler 106. At the same time, it extracts print information from the converted data and transmits the same, as a driver log 112, to the job account client 118.

The job account client 118 continuously monitors the spooler 106 for jobs. If any log is found, the job account client 118 issues an API prescribed for the OS, obtains print information, and obtains the same as an API log 113.

The transmitting section 107 communicates, via the network, with any or the printers 108, 109 and 110, which is specified by the application and, if the printer is ready for operation, transmits the print data thereto. Here, for example, if a command of the Printer Job Language prescribed by the HP Company is used, the number of pages of ejected sheets for the print job can be obtained after all the sheets for the job is completely ejected in the printer 109. The transmitting section (port monitor) 107 transmits the job information including the number of pages received from the printer 109 to the job account client 110. A print log created based on the information is referred to as a transmission section log 114.

In this way, the job account client 110 (obtaining means) obtains four logs, that is, the hook log, the driver log, the API log and the transmission section log, which are created for one print job. However, the four logs cannot always be obtained. For example, if the application directly transmits the print data to the spooler 106, the hook log 111 and the driver log 112 cannot be obtained. If any protocol is not prescribed between the printer driver 105 and the job account client 118, the driver log 112 cannot be obtained. If there is not provided a capability of notifying the transmitting section of the number of pages of ejected sheets, which is implemented in the printer 108, the information on the number of pages of ejected sheets in the transmission section log 114 cannot be obtained. However, since the logs are obtained in plural steps involved in the job, even if a log cannot be obtained in a step, the jobs can be obtained with an increased probability as a whole.

The printer 108 interprets the job transmitted from the transmitting section 107 and performs printing. The printer 109 interprets the job transmitted from the transmitting section 107 and performs printing. Upon completion of printing, they transmit the number of ejected sheets back to the transmitting section 107. The printer 110 interprets the job transmitted from the transmitting section 107 and performs printing. Upon completion of printing, it stores the job information in a HDD 304 described later.

A job log merging section 116 merges the hook log, the driver log, the API log and the transmission section log and transmits them to a job log transmitting section 117. The merging processing will be described later. The job log transmitting section 117 transmits the job logs to a job log receiving section 122 in the job account server 121.

Figure 2:
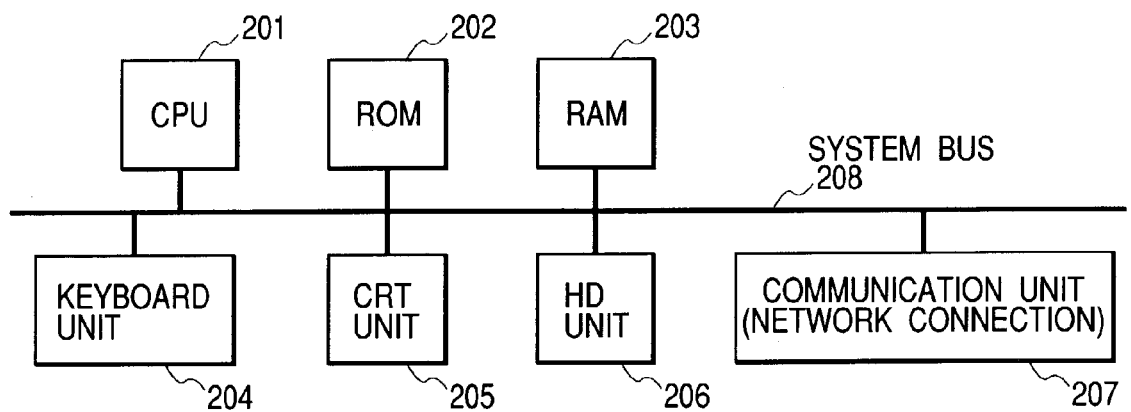
FIG. 2 is a block diagram showing a configuration of a client computer and a server computer in the job account system shown in FIG. 1.

FIG. 2 is a block diagram showing a configuration of the client computer and the server computer in the job account system shown in FIG. 1. In FIG. 2, reference numeral 201 denotes a CPU or central processing unit, which performs control of whole of the computer apparatus, an arithmetic processing and the like. Reference numeral 202 denotes a ROM or read only memory, which is a storage region for information including the system start-up program. Reference numeral 203 denotes a RAM or random access memory, which is a data storage region available for any use. Software modules including the operating system, the application 102, the hook section 103, the GDI 104, the printer driver 105, the transmitting section 107 and the job account client 118 and the programs for communication control and the like are loaded into this region from a HD unit 205 or the ROM 202 and executed by the CPU 201. Reference numeral 204 denotes a KBC or keyboard control unit, which receives input data from a keyboard and transmits the same to the CPU. Reference numeral 205 denotes a CRT or display control unit (display control means), which controls display of a display apparatus. Reference numeral 206 denotes an external storage device, such as a FD or floppy® disk device, a HD or hard disk device, or a non-volatile storage device such as SRAM. It stores programs and data, which are referred to or loaded into the RAM if required during execution. Reference numeral 207 denotes a communication unit, which controls network communication. It can communicate with another computer or peripheral apparatus connected to the network as described with reference to FIG. 1 and is controlled by the transmitting section 107 and the job log transmitting section 117. Reference numeral 208 denotes a system bus, which constitutes a data path interconnecting the components described above.

Essentially, the job account server 121 is constructed the same in terms of hardware. In the job account server 121, the HDD stores a job log merging section 123, a job log recording section 124, the job log receiving section 122 and a job log accumulating section 125. Besides, the job log receiving section 122 controls the communication section 207.

Figure 3:
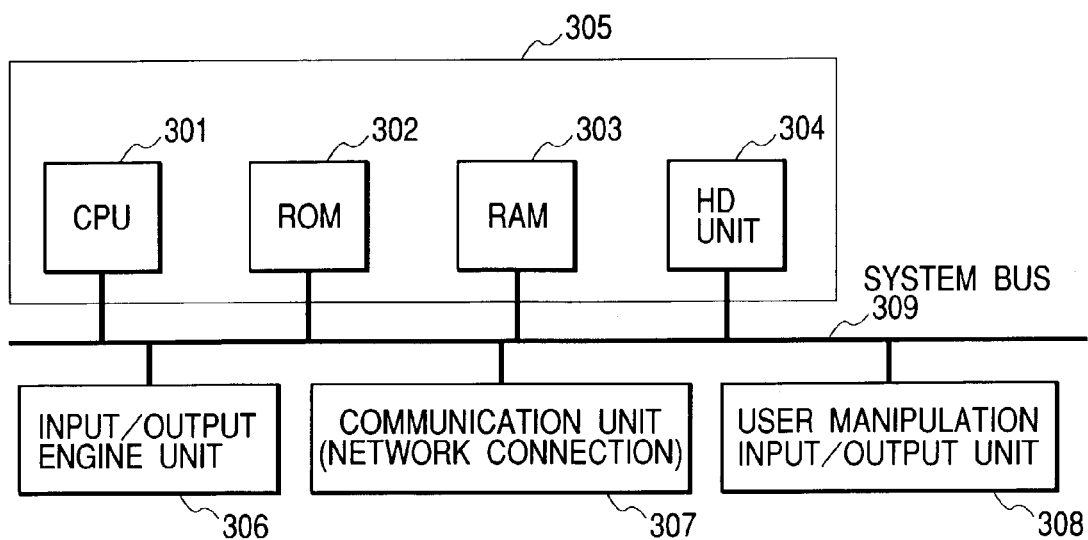
FIG. 3 is a block diagram showing a configuration of a printer in the job account system shown in FIG. 1.

FIG. 3 is a block diagram showing a configuration of a printer in the job account system shown in FIG. 1. In FIG. 3, reference numeral 305 denotes a controller which controls whole of the printer. In the controller, reference numeral 301 denotes a CPU or central processing unit, which performs control of the controller, an arithmetic processing and the like. Reference numeral 302 denotes a ROM or read only memory, which is a storage region for information including the system start-up program. Reference numeral 303 denotes a RAM or random access memory, which is a data storage region available for any use. Reference numeral 304 denotes a HD or hard disk device, or non-volatile storage device such as SRAM.

The operating system and programs for communication control or engine control are loaded into the RAM 303 for execution. Reference numeral 306 denotes an engine unit of this apparatus, which performs printing or image read-in under the control of the controller. Reference numeral 307 denotes a communication unit, which controls network communication. It can communicate with the client computer or the server computer as described with reference to FIG. 1. Reference numeral 308 denotes a user manipulation input/output unit, which allows setting by a user in an interactive manner. Reference numeral 309 denotes a system bus, which constitutes a data path interconnecting the components described above.

Figure 4:
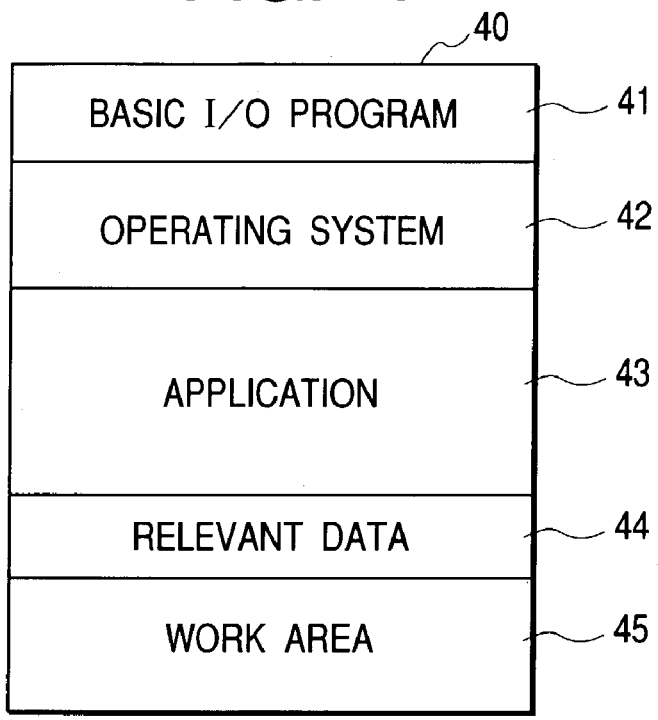
FIG. 4 shows an example of a memory map of the job account system shown in FIG. 1.

FIG. 4 shows an example of a memory map of the job account server 121 shown in FIG. 1. Reference numeral 41 denotes a basic I/O program. Reference numeral 42 indicates the memory map of the RAM 203 in a state where the operating system such as a window system is loaded thereto and enabled. Reference numeral 43 indicates the memory map of the RAM 203 in a state where the program according to this invention is loaded thereto and enabled. Reference numeral 44 indicates the memory map of the RAM 203 in a state where relevant data is loaded thereto and enabled. Reference numeral 45 denotes a memory map of a work memory available to the programs.

Figure 5:
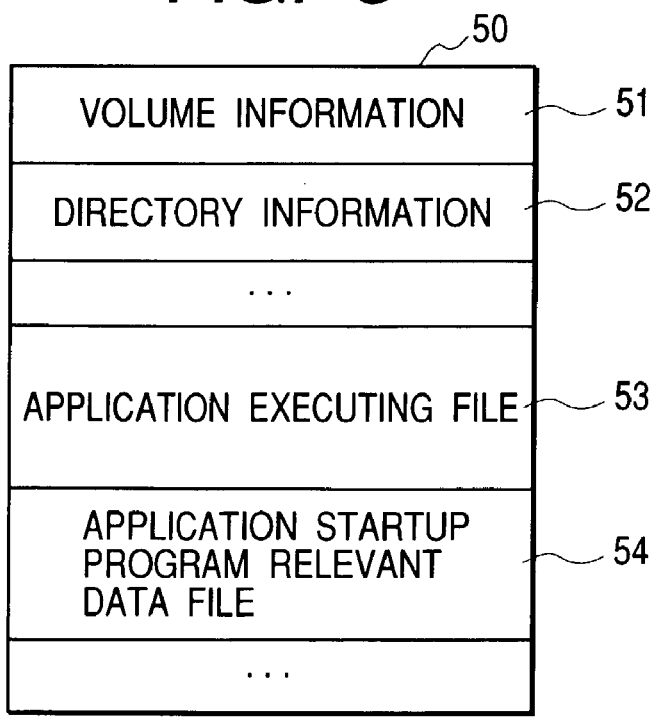
FIG. 5 shows a configuration of a FD storing a job account program according to an embodiment of this invention and relevant data.

FIG. 5 shows a configuration of the FD storing a job account program according to an embodiment of this invention and relevant data. The job account program according to an embodiment of this invention and the relevant data are recorded in the floppy® disk (FD). In a recording region 50 in the floppy® disk (FD), volume information 51, directory information 52, an application executing file 53 and a job account program relevant data file 54 are recorded. Of course, the recording region 50 may be provided by a DVD or HDD (not shown) in an external server apparatus connected to a computer 62 via a network, and the job account program according to this invention (the modules in the client computer and job account server 121 shown in FIG. 1) may be downloaded thereto via the network. The computer 62 is the same as that shown in FIG. 2.

Figure 6:
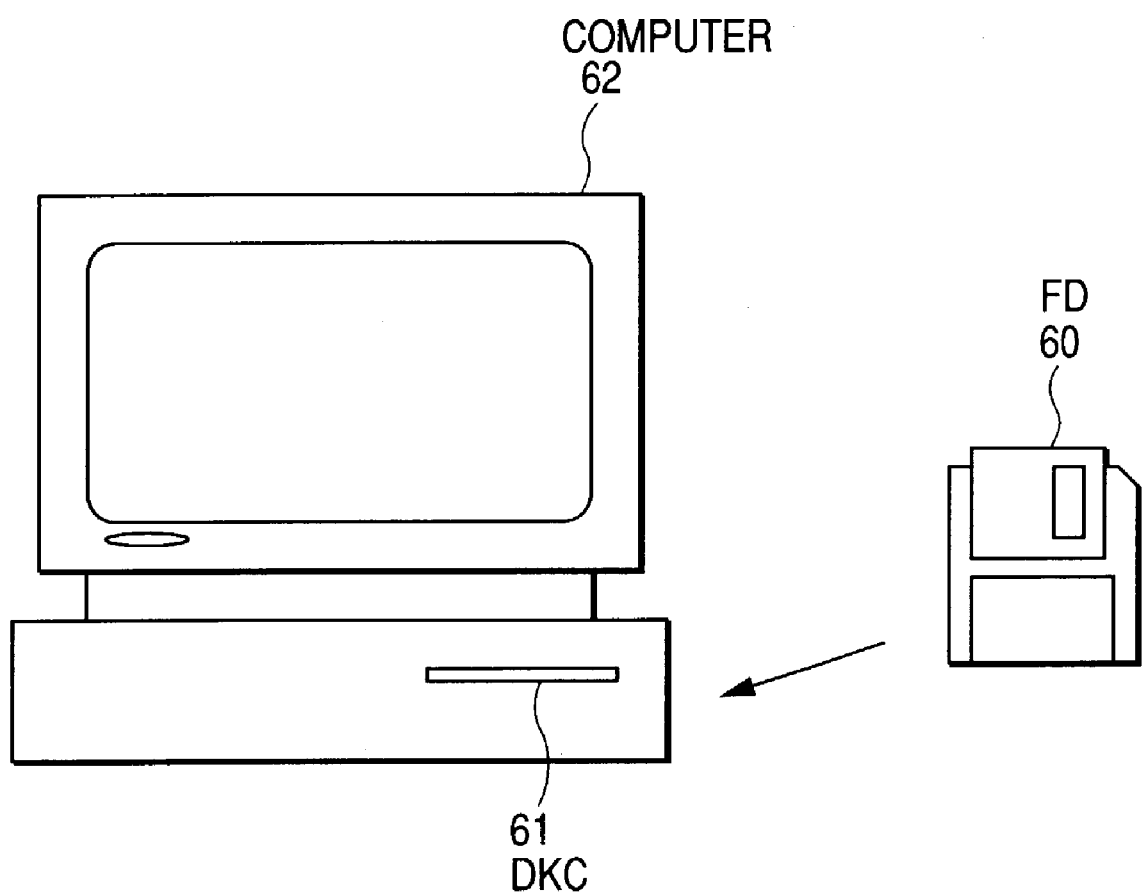
FIG. 6 illustrates loading of the job account program according to an embodiment of this invention and the relevant data recorded in a FD into a computer system.

FIG. 6 illustrates loading of the job account program according to an embodiment of this invention and the relevant data recorded in the FD into the computer system. The job account program and the relevant data recorded in a floppy® disk (FD) 60 can be loaded into the computer 62 through a FD drive (DKC) 61. When the floppy® disk (FD) 60 is inserted into the FD drive (DKC) 61, the program modules for implementing the job account program and the relevant data are read from the floppy® disk (FD) 60 under the control of the operating system 42 and the basic I/O program 41, loaded into the RAM 203 and enabled. The computer 62 can be used to implement the computer shown in FIG. 18 and the client computer 101 or job account server 121 shown in FIG. 1. The program modules for implementing the job account program are equivalent to the software modules in the client computer 101 or job account server 121. Of course, the storage medium is not limited to the FD and may be a DVD, CD-ROM or the like.

FIG. 7 shows an example of the hook log according to an embodiment of this invention. The hook log can provide a JobId, an application name, the number of logical pages and a document name. The JobId can be obtained from the GDI when instructing the GDI to start printing and uniquely specify a print job of the client computer 101.

FIG. 8 shows an example of the driver log according to an embodiment of this invention. The driver log is history information which the job account client can obtain from a driver when performing printing. The driver log can provide a JobId, which is an identifier of a job involved in performing printing, the paper size for the print data included in the job, N-up information, information on the number of physical pages and simplex/duplex information. The paper size information, the N-up information, the information on the number of physical pages and the simplex/duplex information are obtained from print settings entered to the printer driver when performing printing or as a default. The N-up information is a setting indicating how many logical pages are to be allocated to one sheet of paper. In counting the number of physical pages, each side of each of the sheets of paper ejected during printing is regarded as one page.

For example, if 2-up duplex printing is performed when the number of logical pages is 4, the number of physical pages is 2. Furthermore, since the physical pages are printed onto both sides of the sheet of paper, one sheet of paper is ejected. The first and second logical pages are printed onto a front surface of the sheet, and the third and fourth logical pages are printed onto a rear surface of the sheet.

FIG. 9 shows an example of the API log according to this embodiment. The API log can provide a JobId, an owner name of the job and a spooled data size.

FIG. 10 shows an example of a transmission section log according to an embodiment of this invention. The monitor log can provide a JobId. If it is transmitted to the printer 108, the number of pages of ejected sheets and the number of ejected sheets can be additionally obtained.

The hook log, the driver log, the API log and the transmission section log all have regions in which flag information indicating whether the job is processed or not and information indicating the type of the log are recorded.

Figure 11:
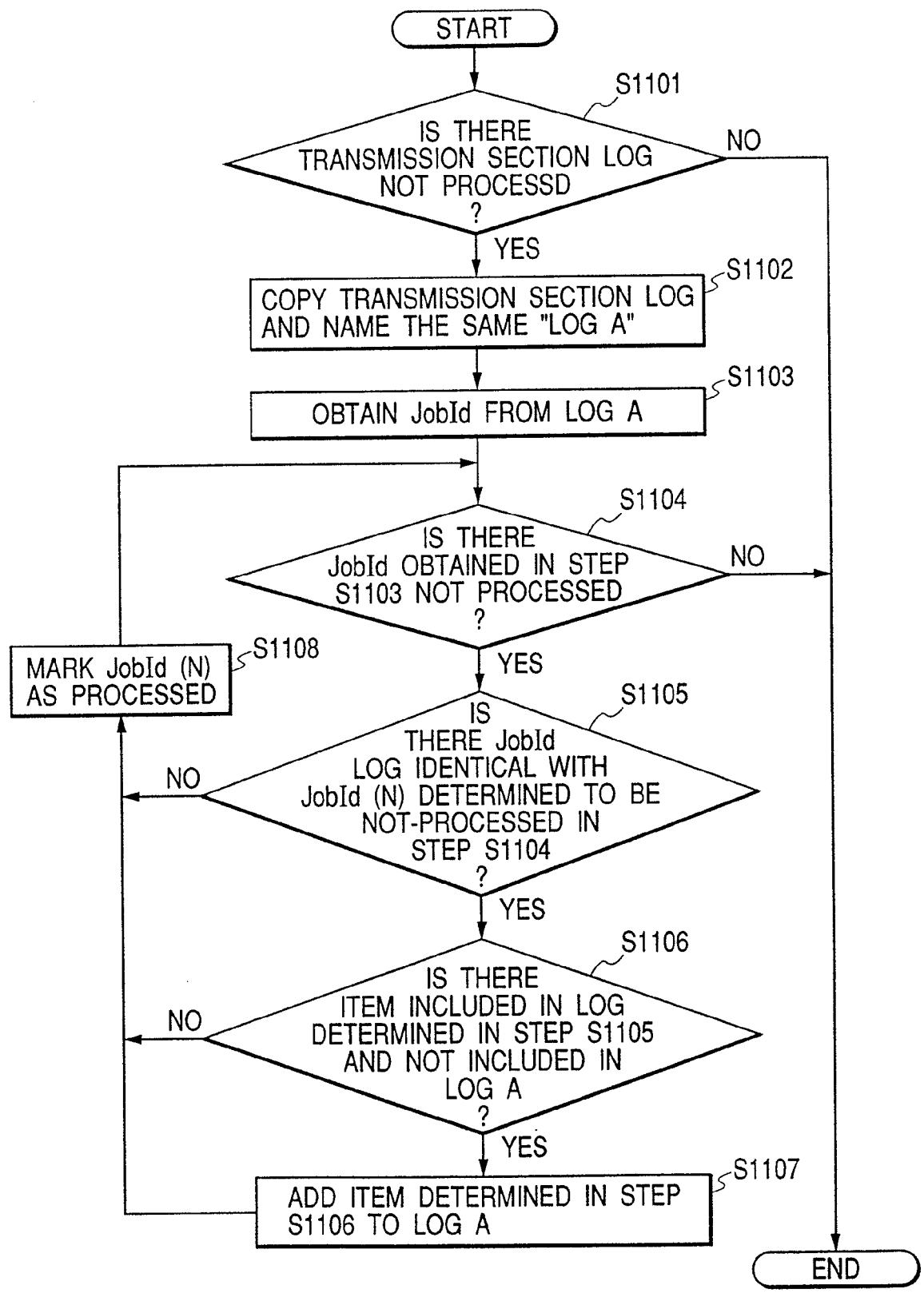
FIG. 11 is a flowchart showing a procedure of merging a log according to an embodiment of this invention.

FIG. 11 is a flowchart showing a procedure of merging a log according to an embodiment of this invention. In the following, referring to the flowchart in FIG. 11, an operation of the job log merging section 116 in the client computer will be described. The job log merging section 116 receives the logs described with reference to FIGS. 1 and 18 and records the contents thereof in the HDD or the like. Then, the process described below is periodically activated at prescribed intervals to perform a merge processing on each job. In this embodiment, the log is merged using the job ID as a key. However, the document name or new document name described later may be used as a key. According to the process shown in FIG. 11 and described below, in the client computer, the job log merging section 116 can determine the earliest start time and the latest end time among start times and end times indicated by entries of start time information and end time information, respectively, which are included in the job information (hook log, API log and API log) obtained in a plurality of processings in the client apparatus. Then, the pieces of time information are merged and stored as merged job information as described above.

In step S1101, the job log merging section 116 determines whether there is a transmission section log having a processed flag not turned into YES (see FIG. 10), that is, a transmission section log not processed. If there is a transmission section log not processed, the process continues to step S1102. In step S1102, the job log merging section 116 copies the transmission section log determined to be not-processed in step S1101 into another temporary storage region and names the copy a "log A". In step S1103, the job log merging section 116 obtains the JobId from the log A. In step S1104, the job log merging section 116 searches the hook log, the driver log and the API log, thereby determining whether there is a log not subject to merging, that is, a log not processed in the logs associated with the JobId obtained in step S1103 based on the JobId. If it is determined that there is no log not processed in step S1104, the process ends. If the job log merging section 116 determines that there is a log not processed in step S1104, the process continues to step S1105. In this step, the job log merging section 116 searches the hook log, the driver log and the API log, thereby determining whether there is a log having the same JobId as the JobId (conveniently assumed to be "N", here) for which the log is determined as not-processed in step S1103 based on the JobId, and if any, names the log a "log B". If a log having the same JobId as N is not found in the hook log, the driver log and the API log in step S1105, the process continues to step S1108. If a log having the same JobId as N is found in the hook log, the driver log and the API log in step S1105, the process continues to step S1106. Here, in step S1105, the "N" may be assigned to the smallest JobId in those included in the log A not processed.

In step S1106, the job log merging section 116 determines, for items in the log associated with the JobId N of the log A specified in step S1105 (job information included in each log obtained for the JobId N), whether there is an item which is included in the log B and not included in the log A. If it is determined that there is no item which is included in the log B and not included in the log A for the items in the log associated with the JobId N in step S1106, the job log merging section 116 performs the processing of step S1108. If it is determined that the log B has an item not included in the log A in step S1106, the process continues to step S1107. In this step, the job log merging section 116 adds the item in the log B which is not included in the log A to the items of the log A of the JobId N, thereby providing merge data of the log A. Then, the processed flag of the log created by adding the item of the log B to the log A (referred to as merge log, hereinafter) is turned into YES, and the process continues to step S1108. Then, "merge" is entered to the item of type of the merge log. Successively merging the logs shown in FIGS. 7 to 10 with the transmission section log in accordance with the process shown in FIG. 11 provides the merge log shown in FIG. 12. As shown, the merge log comprises the hook log, the driver log, the API log and the transmission section log. FIG. 12 shows an example o the merge log according to an embodiment of this invention.

In step S1104, which follows step S1108, if it is determined that processing of all the JobIds involved in the log A is completed, the process ends. Normally, every time the merge processing is completed, the job log merging section 116 transmits the merge log to the log transmitting section 117 after the process shown in FIG. 11. The log transmitting section 117 transmits the log to the job log receiving section 122 at regular intervals or in response to a request from the job log receiving section.

Next, an operation of the job account server 121 will be described. The job log receiving section 122 receives and accumulates the jobs transmitted from the job log transmitting section 117. In addition, the job log receiving section 122 regularly polls the printer 110 and, if there is job information which it has not obtained, obtains the job information. This job information is referred to as an apparatus log. The apparatus log is stored in the RAM 303 or HDD 304. However, it is undesirable that the information including a document name transmitted from the transmission section 107 is entirely stored because of the limited storage capacity. The available document name is composed of up to 8 characters herein. FIG. 13 shows an example of the apparatus log. FIG. 14 shows an example of the apparatus log resulting when the hook section 103 is inactive. The apparatus log shown in FIG. 14 includes the actual number of pages of ejected sheets, the actual number of ejected sheets, the model name, the start time of processing in the printer, and the output time such as the end time of ejection.

The job log merging section 123, which is a preferred example of the managing means according to this invention and serves also as first and second obtaining means, obtains a merge log 127 transmitted from the job account client through the job log receiving section 122 and obtains an apparatus log 115. Then, the job log merging section 123 merges the logs for management. A procedure of merging the logs will be described later. The job log recording section 124 receives the job logs from the apparatus job log merging section 123 and stores the logs in the HD 206 or the like. The job log accumulating section 125 conducts accumulation processing, such as finding the number of pages to be printed for each unit period and finding the number of pages printed for each owner.

An ID generating section 126 issues an ID for uniquely identifying the client computer 101. Here, in response to a request from the hook section 103, the ID generating section issues a string of four characters each of which can be selected from 26 characters of a to z, the string being sequentially changed to uniquely identify a client, for example, aaaa, aaab, . . . , zzzy, zzzz. A new document name is created by combining a host and a job ID, herein. However, the job account server may unifiedly issue a new document name (described later) which is uniquely identified in whole of the system.

Figure 15:
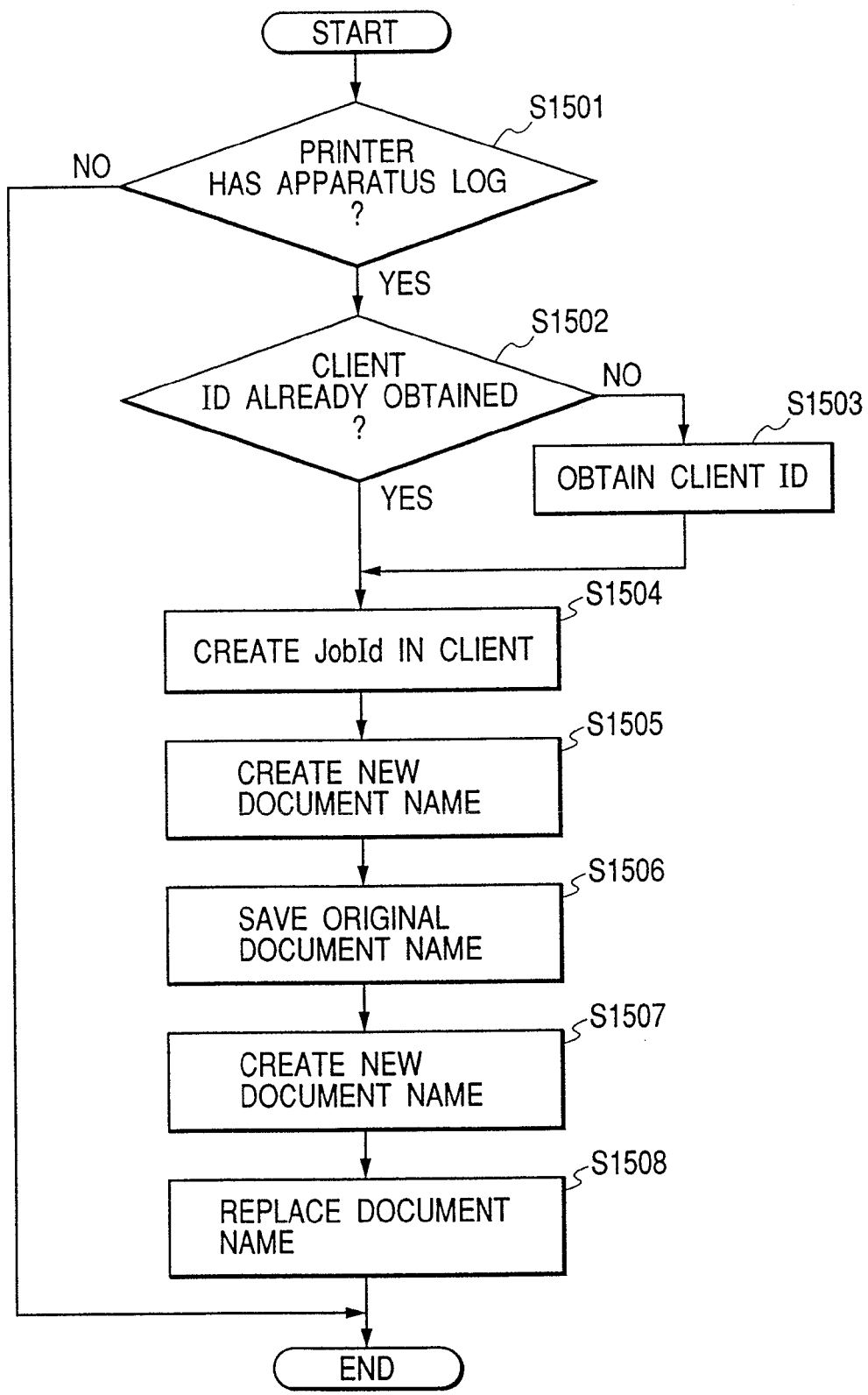
FIG. 15 is a flowchart showing a procedure of changing a document name according to an embodiment of this invention.

FIG. 15 is a flowchart showing a procedure of changing a document name according to an embodiment of this invention. In the following, referring to the flowchart in FIG. 15, an operation of the hook section 103 will be described. In step S1501, the hook section 103 obtains information indicating whether a target printer has an apparatus log or not in accordance with a predetermined apparatus management protocol and determines whether the target printer has an apparatus log or not. If it is determined that the printer has an apparatus log, the process continues to step S1502. If the hook section 103 determines that the printer has no apparatus log, the process ends. In step S1502, the hook section 103 determines whether a client ID has been already obtained. If a client ID has been already obtained, the process continues to step S1504. Otherwise, the process continues to step S1503. Here, the client ID is identification information that is issued by the ID generating section and allows a client computer 101 to be uniquely identified. In step S1503, the hook section 103 communicates with the ID generating section 126, thereby obtaining the ID that uniquely identifies the client computer therefrom. In step S1504, an in-client JOBID is created which uniquely identifies a job in the client computer. As the in-client JOBID, numerical values 0001 to 9999 are sequentially issued herein.

In step S1505, the hook section 103 combines the client ID determined to be already-obtained in step S1502 or client Id obtained in step S1503 and the in-client JobID created in step 1504, thereby producing a new document name, which is an example of new identification information which is uniquely determined in the printing system. In step S1506, the hook section 103 stores the original document name passed from the application in an item "original document name" of the hook log. In step S1507, the old document name is replaced with the new document name created in step S1505. As a result, the document name passed to the GDI is the new document name. It is preferred that the new document name is used in all the following processings in the printer driver 105, the spooler 106, the transmission section 107 and the printer 110.

The reason why the new document name is created is that it is difficult to use the JobID as it is as a key for the merge processing when the job information obtained from the printing apparatus is to be merged. For example, since part of the specification of the job management method is not opened, an account server developed by A company often cannot obtain a JobID from a printer developed by B company. In other words, if the job information is obtained from a printer designed for an unexpected job management method, the job ID is not included in the job information in many cases, and thus, the job information cannot be used by merging. However, the document name created by the OS or application in the client computer and transmitted to the printer can be obtained as job information in many cases.

Thus, it is contemplated that, instead of the job ID, the document name, which can be managed in the client and can be provided to the printer as a key for the job information instead of the JobID, is used as the identification information. However, using the original document name as it is causes a problem. In general, the OS or application of the client can manage a document name composed of more than 8 characters. The general OSs can provide a document name composed of up to 255 characters. However, the printer can manage a document name composed of up to 8 characters, as described above. In addition, generally, the document name available in the job management method is composed of up to 8 characters. Thus, when the OS or application of the client provides document names composed of more than 8 characters, even if the document names are different from each other in the client, they seems to be the same to the printer. Thus, the printer has jobs with the same document name at the same time, creating confusion. Therefore, the account server issues a host ID and the host ID is combined with the document name issued by the client. This provides a new document name that is composed of up to 8 characters, managed by the account server and uniquely determined in the printing system including the client computer and the printer. And, this new document name can be used for identifying the job instead of the job ID. Once the new document name is created in the client, the document name can be used as a job identifier in the printer, the client and the account server.

Figure 16:
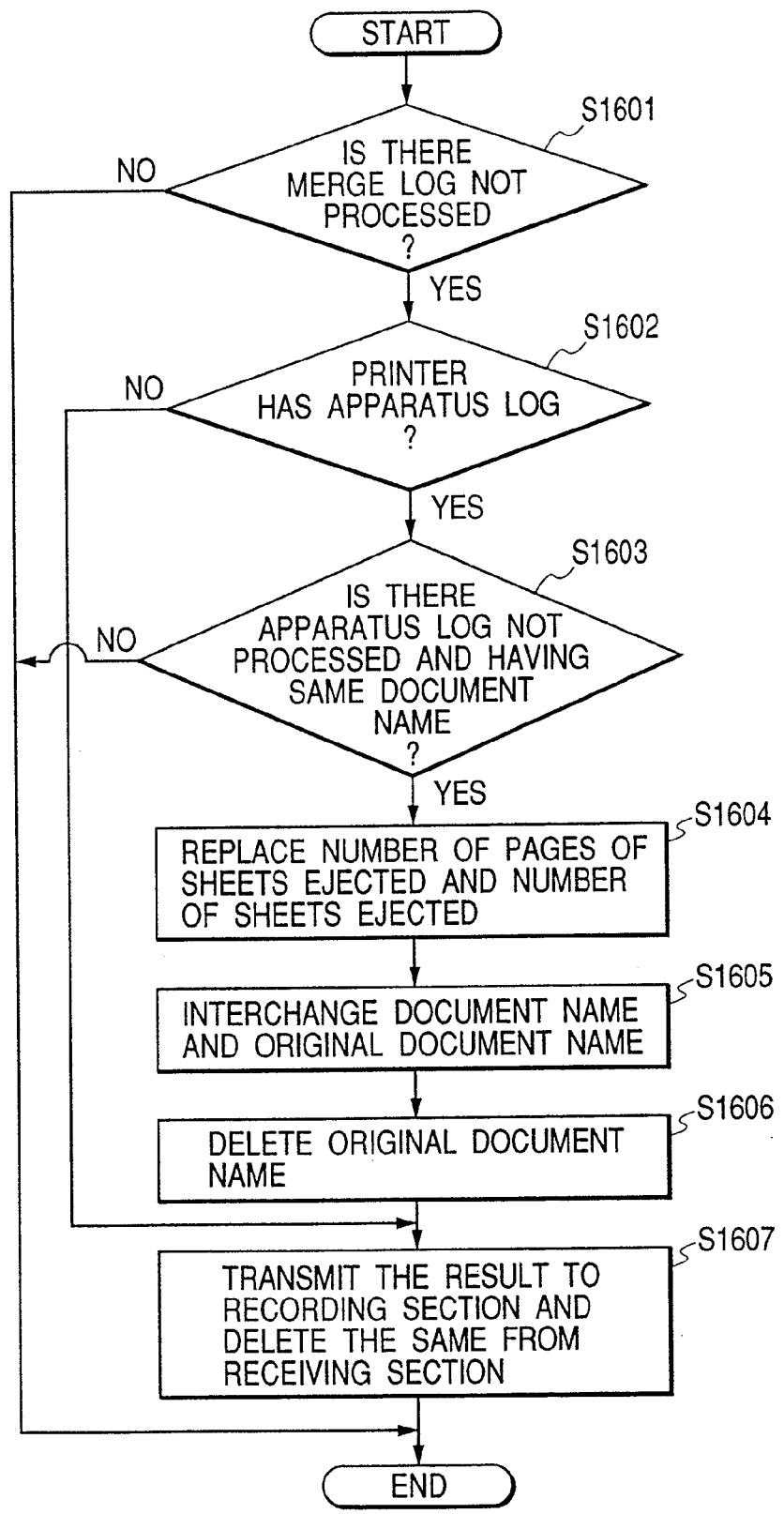
FIG. 16 is a flowchart showing a procedure of merging logs to create a final log according to an embodiment of this invention.

FIG. 16 is a flowchart showing a procedure of merging logs to create a final log according to an embodiment of this invention. Referring to the flowchart in FIG. 16, an operation of the job log merging section 123 (apparatus job log merging section) will be described.

In step S1601, the job log merging section 123 searches for a merge log not processed, and if any, the process continues to step S1602. In step S1602, the job log merging section 123 determines whether the printer has an apparatus log or not, and if the printer has an apparatus log, the process continues to step S1603. Otherwise, the process continues to step S1607. In step S1603, the apparatus job log merging section 123 determines whether there is an apparatus log which is not processed and has the same document name as that of the merge log in step S1601. If it is determined that there is such an apparatus log, the process continues to step S1604. If it is determined that there is not the same apparatus log as the merge log in step S1601, the process ends. In step S1604, the apparatus job log merging section 123 replaces the number of pages of ejected sheets and the number of ejected sheets of the merge log with those of the apparatus log or adds the number of pages of ejected sheets and the number of ejected sheets of the apparatus log to the merge log.

FIG. 13 shows an example of the apparatus log according to an embodiment of this invention. In step S1605, the job log merging section 123 interchanges the document name and the original document name. Applying this to the apparatus logs in FIGS. 12 and 13 results in the document name "2001 annual report" and the original document name "abcd0001".

In step S1606, the apparatus job log merging section 123 deletes the original document name of the merge log. The resulting log is the final log. Applying this to the apparatus logs shown in FIGS. 12 and 13 provides the final log shown in FIG. 17. In step S1607, the apparatus job log merging section 123 transmits the final log to the job log recording section 124.

As described above, according to this invention, job information including a more precise document name and more accurate information on the number of ejected sheets can be obtained, and thus, more adequate job accounting can be conducted. That is, since this invention provides a mechanism that conducts merging based on a single piece of identification information in the printing system managed by the account server, the possibility of managing different jobs as a same job by mistake in managing job information, counting the number of printed sheets or ejected sheets or the like is eliminated, and thus, adequate job accounting can be conducted.

Second Embodiment

Figure 19:
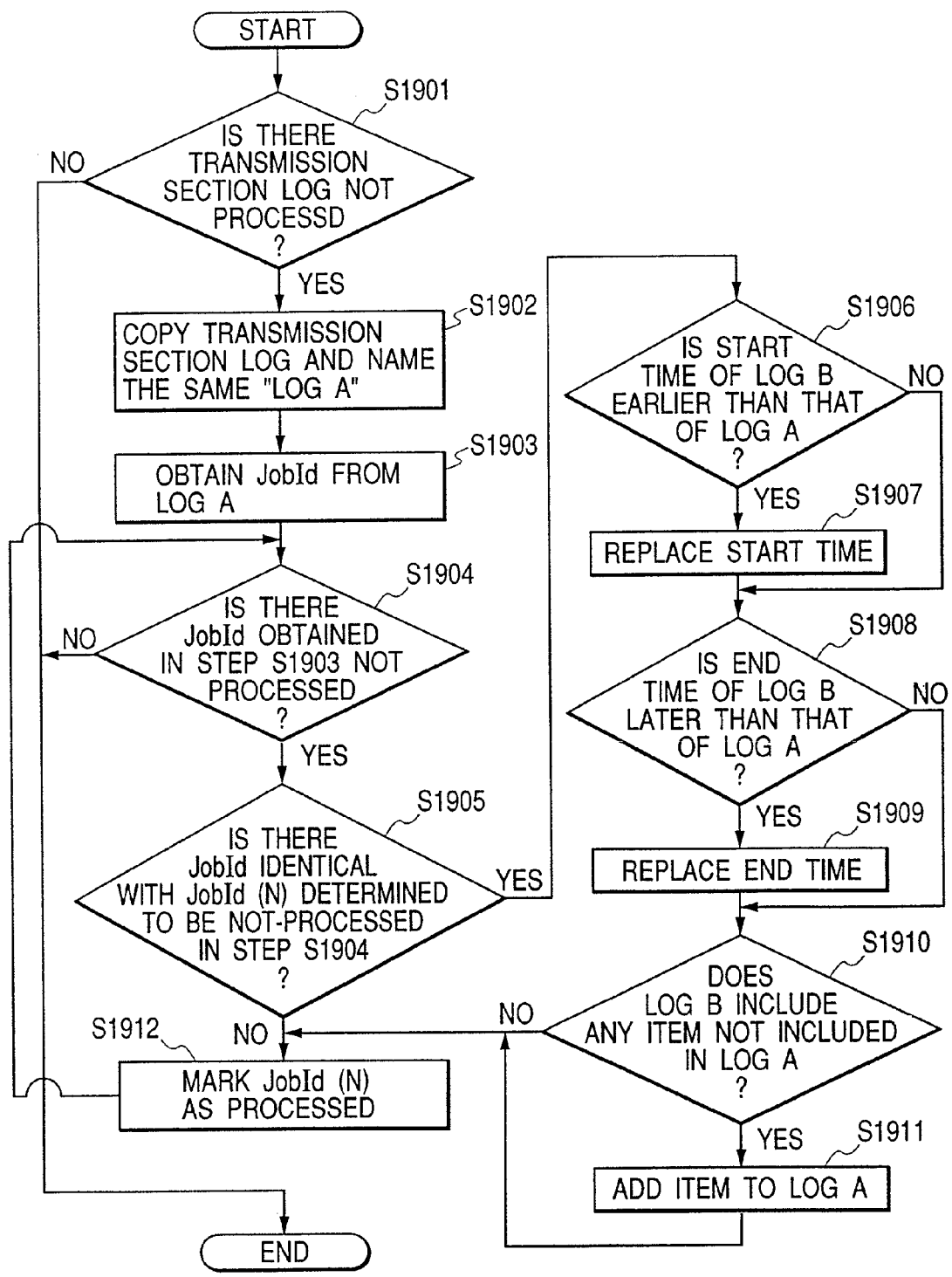
FIG. 19 illustrates an example of a merge processing in a job log merging section 116 according to an embodiment of this invention.

The following description will be made primarily about differences from the first embodiment. FIG. 19 illustrates an example of the merge processing in the job log merging section 116 according to an embodiment of this invention. In the following, referring to the flowchart in FIG. 19, an operation of the job log merging section 116 will be described. The job log merging section 116 receives the logs and records the contents in the HDD or the like in the client computer. Then, the process described below is activated at regular intervals. In step S1901, the job log merging section 116 searches for a transmission section log not processed. If there is a transmission section log not processed, the process continues to step S1902. If it is determined that there is no log not processed in step S1901, the process ends. In step S1902, the job log merging section 116 copies the content of the transmission section log and names the copy a "log A". At this point, the processed flag of the transmission section log is turned into "YES". In step S1903, the job log merging section 116 extracts a JobId from the log A. Then, in step S1904, the job log merging section 116 determines whether a JobID not subject to merging and time determination processing is included in the JobIDs associated with the log A obtained in step S1903.

If it is determined in step S1904 that there is no JobID not processed, the process ends. If the job log merging section 116 determines that there is job information associated with the JobId not processed in step S1904, the process continues to step S1905. In step S1905 and the following steps, the JobID having the smallest number in the JobIDs determined to be not-processed in step S1903 is assigned a name "N". In step S1905, the job log merging section 116 searches the hook log, the driver log, the API log and the transmission section log for a log having the same JobID as the JobID N and, if any, names the log "log B". If the job log merging section 116 determines that there is not a log having the same JobId as N in step S1905, the JobID N is marked as processed in step S1912, and the process continues to determination processing for another JobID not processed (step S1904). If the job log merging section 116 determines that there is a log having the same JobId as N in step S1905, the process continues to step S1906 and the following steps for merging.

In step S1906 and the following steps, processings are performed on an entry of job information having the JobID N. In step S1906, it is determined whether the start time of the log B is earlier than the start time of the log A. If the start time of the log B is earlier than the start time of the log A, the process continues to step S1907. Otherwise, the process continues to step S1908. In step S1907, the job log merging section 116 overwrites the start time of the log A with the start time of the log B, and then, the process continues to step S1908.

In step S1908, the job log merging section 116 determines whether the end time of the log B is later than the end time of the log A. If it is determined that the end time of the log B is later than the end time of the log A, the process continues to step S1909. Otherwise, the process continues to step S1910. In step S1909, the job log merging section 116 overwrites the end time of the log A with the end time of the log B, and then, the process continues to step S1910. In step S1910, the job log merging section 116 determines whether the log B includes an item not included in the log A. If it is determined that the log B includes an item not included in the log A, the process continues to step S1911. Otherwise, the process continues to step S1912. In step S1911, the job log merging section 116 adds the item of the log B not included in the log A to the log A. At this point, the processed flag of the log B is turned into "YES". In addition, the type is set to "merge". Subjecting the logs shown in FIGS. 7 to 10 to the process shown in FIG. 19 provides the log shown in FIG. 12. As shown, the log includes items of the hook log, the driver log, the API log and the transmission section log, in which the start time is of the hook log and the end time is of the transmission section log. Thus, the throughput from the generation of one job to the completion of the processing, that is, from the print instruction input to the application to the completion of paper ejection, can be grasped. After the process shown in FIG. 19, the job log merging section 116 transmits the merge log to the log transmitting section 117. The job log transmitting section 117 regularly transmits the log (merge job information) to the job log receiving section 122.

This process eliminates the need of arranging, in chronological order of processing data, the order of merging the logs that can be obtained in image processing and output processing. As described above, the new document name can be used for merging, instead of the JobID.

As described above, in the client apparatus that processes a job that requires a plurality of data processings, the job log merging section 116 which is a preferred example of determining means according to this invention and obtains a plurality of pieces of job information obtained in the plurality of data processings for one job can determine the earliest start time in the start time information included in the plurality of pieces of job information. In addition, if the job log merging section 116 is controlled to overwrite the end time with the latest one as in the process described above, the merge log is to retain the latest end time, and thus the latest end time can be determined.

According to another example of this embodiment, the hook log, the driver log, the API log and the transmission section log associated with one job ID are arranged in an order regarding the item thereof concerning time. Then, merging is conducted in this order. The item concerning time needs to be subject to an overwrite merge processing in the arrangement order.

Figure 20:
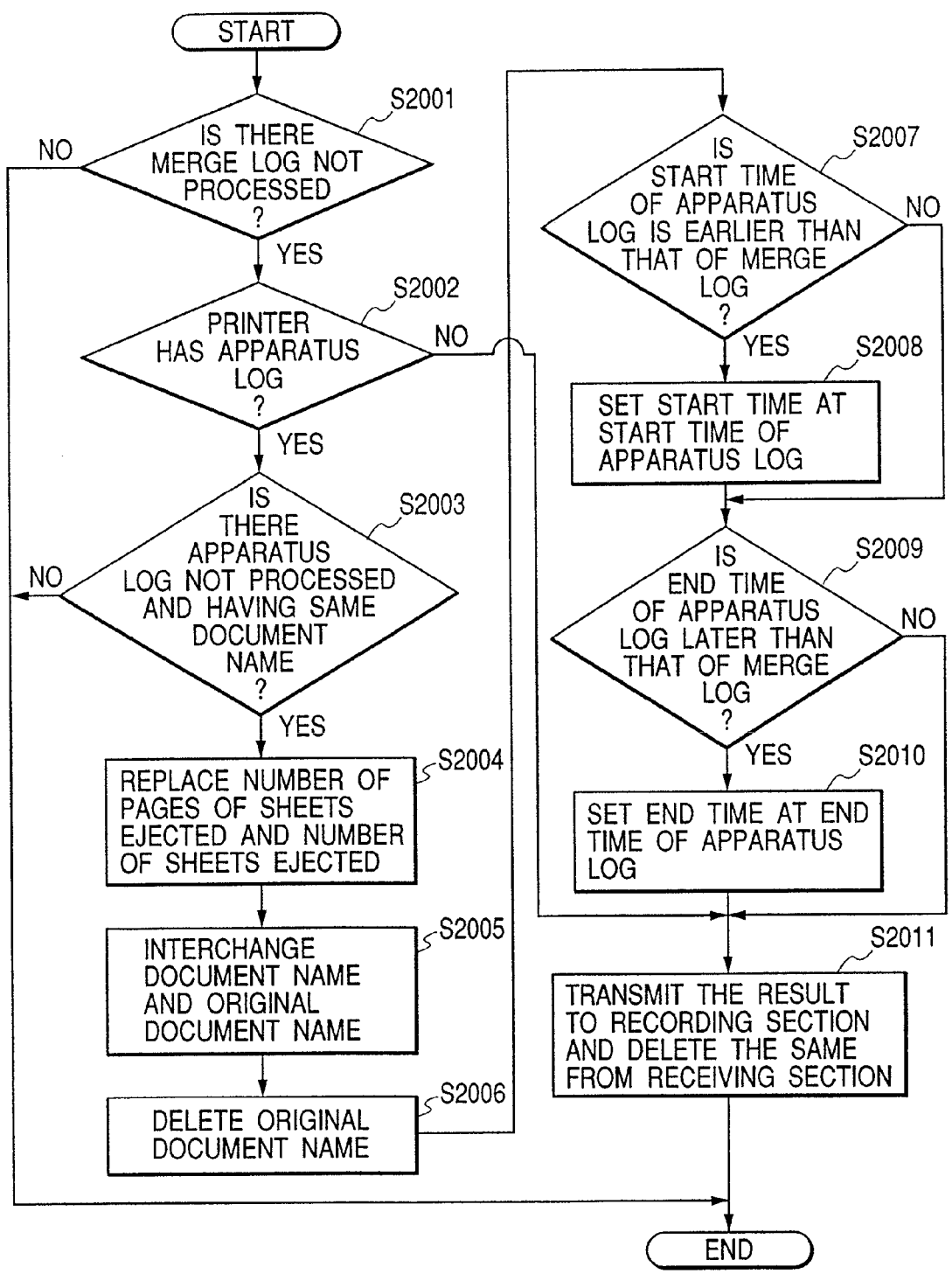
FIG. 20 illustrates an example of a merge processing in a job log merging section 123 according to an embodiment of this invention.

FIG. 20 illustrates an example of the merge processing in the job log merging section 123 according to an embodiment of this invention. In the following, referring to the flowchart shown in FIG. 20, an operation of the job log merging section 123 will be described. A merge log is transmitted to the account server apparatus, and the same process as that shown in FIG. 15 is conducted. That is, based on the information generated in the ID generating section, the new document name is stored in the merge log, and the old document name is backed up in the item for the old document name. Thus, the job log merging section 123 creates the final log from the merge log. The following is modification of the above-described processing of the merge log.

In step S2001, the job log merging section 123 searches a merge log that is obtained from the client computer and not processed, and if any, the process continues to step S2002. Otherwise, the process ends. In step S2002, the job log merging section 123 determines whether the printer has an apparatus log or not, and if the printer has an apparatus log, the process continues to step S2003. Otherwise, the process continues to step S2011. In step S2003, for apparatus logs obtained from the printer, the job log merging section 123 determines whether there is an apparatus log which is not processed and has the same document name as that of the merge log in step S2001. If it is determined that there is such an apparatus log, the process continues to step S2004. If it is determined that there is not such an apparatus log, the process ends. In step S2004, the job log merging section 123 adds the number of pages of ejected sheets and the number of ejected sheets of the apparatus log to the merge log. In step S2005, the job log merging section 123 interchanges the document name and the original document name. Applying this processing to the apparatus logs in FIGS. 12 and 13 results in the document name "2001 annual report" and the original document name "abcd0001".

FIG. 17 shows an example of the final log according to an embodiment of this invention. In step S2006, the original document name of the merge log is deleted. The resulting log is the final log. Applying this to the logs shown in FIGS. 12 and 13 provides the final log shown in FIG. 17. In step S2007, it is determined whether the start time of the apparatus log is earlier than the start time of the merge log. If the start time of the apparatus log is earlier than the start time of the merge log, the process continues to step S2008. Otherwise, the process continues to step S2009. In step S2008, the start time of the final log is set to the start time of the apparatus log. In step S2009, it is determined whether the end time of the apparatus log is later than the end time of the merge log. If it is determined that the end time of the apparatus log is later than the end time of the merge log, the process continues to step S2010. Otherwise, the process continues to step S2011. In step S2010, the end time of the apparatus log is set to the end time of the apparatus log, and the process ends.

FIG. 21 shows an example of the final log according to an embodiment of this invention. In step S2011, the final log is transmitted to the job log recording section 124. The generated job log is as shown in FIG. 21. This allows the job log merging section 123 to manage the final log so as to include adequate output start time and output end time in the host computer, and an accurate throughput from the start of image processing to the end of output can be measured. The job log merging section 123, which is constituted by an application 43, may instruct the OS 42 to display the final log, as shown in FIG. 21, resulting from combination of the logs on a display screen of the CRT 205 in the job account server 121. That is, the job log merging section 123 controls a processing of displaying, together with the JobID and the document name, a combination of the merge log obtained from the client and the apparatus log obtained from the printer as one list on one display screen. In the past, they have been managed and displayed separately, and therefore, a user had to click on the window system many times to get to a desired display. However, according to this invention, since the merged logs can be displayed as one list as described above, the job management system is improved in display simplicity, visibility and operability.

Preferably, the job log merging section 123 obtains the number of logical pages from the client and obtains the actual number of ejected sheets and the number of pages of ejected sheets from the printer. Here, the number of ejected sheets indicates how many sheets have been ejected, and the number of pages of ejected sheets indicates how many physical pages have been ejected.

That is, the job log merging section 123 obtains a plurality of pieces of job information resulting from a plurality of data processings for one job and can determine the earliest start time and the latest end time among start times and end times indicated by entries of start time information and end time information, respectively, which are included in the hook log, the driver log, the API log and the apparatus log resulting from the plurality of processings for one job which the job log merging section 123 has obtained. Then, the time information is merged and stored as merge job information as described above.

As described above, according to this invention, more precise print start time and print end time can be obtained, and thus, more adequate job accounting can be conducted.

Third Embodiment

Figure 22:
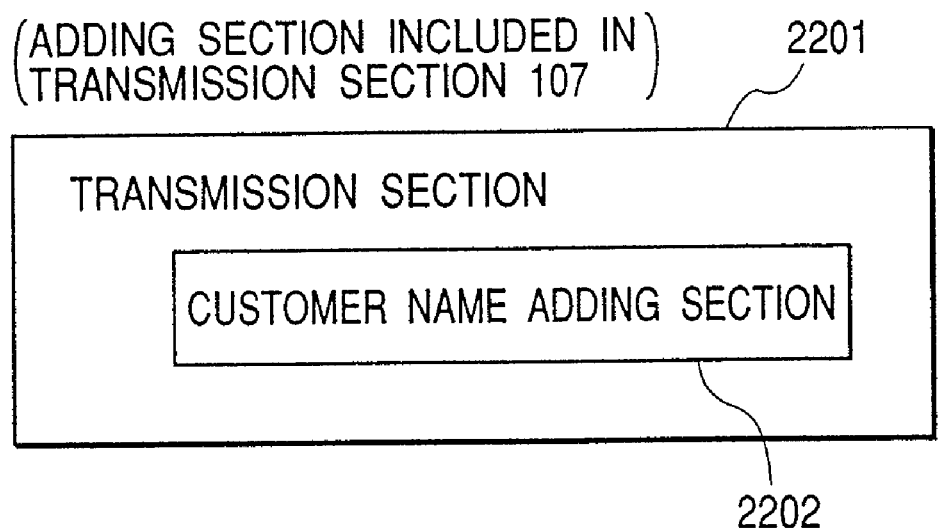
FIG. 22 shows a transmission section with a customer name adding function according to an embodiment of this invention.
Figure 23:
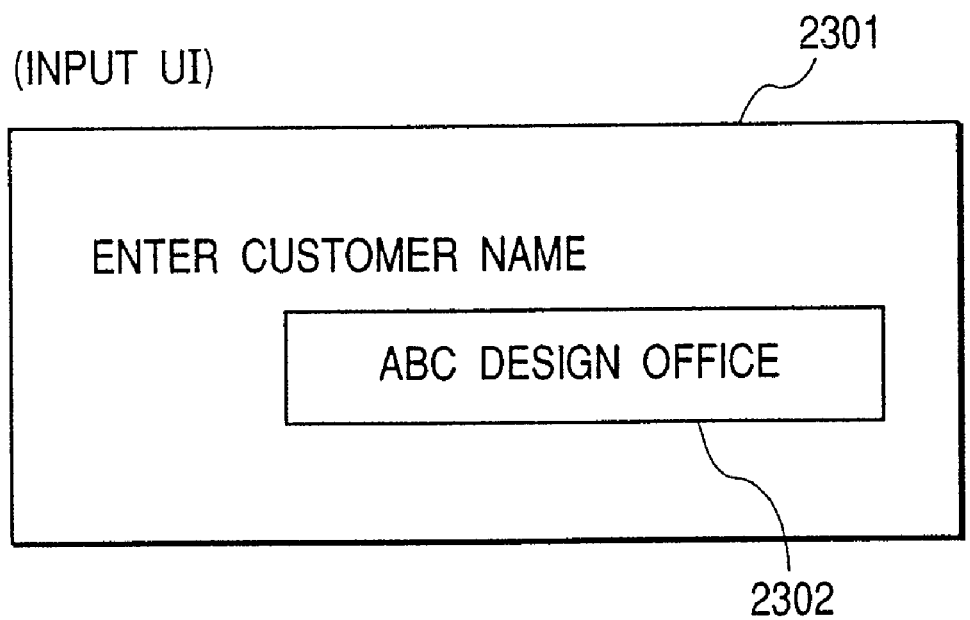
FIG. 23 illustrates entering of a customer name according to an embodiment of this invention.

The following description will be made primarily about differences from the first embodiment. FIG. 22 shows the transmission section 107 in FIG. 1 with a function of adding a customer name. A transmission section 2201 operates the same as the transmission section 107 in FIG. 1. When the transmission section 2201 creates a transmission section log, a customer name adding section 2202 displays a user interface shown in FIG. 23 to prompt a user to enter a customer name. Reference numeral 2301 denotes a dialog window. Reference numeral 2302 denotes a text box into which the user can enter an arbitrary character string. In this drawing, "ABC design office" is entered, for example.

Then, there is provided the transmission section log 2203 additionally including the customer name, as shown in FIG. 24.

The following processings are the same as in the first embodiment.

Thus, the final log as shown in FIG. 25 is provided. If job logs are accumulated for each customer name, costs can be adequately distributed among the customers.

This embodiment can be applied to the second embodiment.

Of course, besides the customer name, any other information can be added to the job log.

As described above, according to this invention, since a function of adding arbitrary information to the job log is provided, flexible job accounting can be conducted.

Fourth Embodiment

This invention is effective even if the printer has no apparatus log. If a unique document name is provided, the hook log, the driver log and the API log can be merged.

Besides, some OSs do not assure that the JobId they issue is unique. In such cases, the determination processing in step S2001 in FIG. 15 is replaced with a processing of determining whether the JobID is unique or not, and if it is determined not to be unique, the document name is changed. In addition, in the above-described embodiments, the JobID of the transmission section log is used in steps S1101 and S1901. However, the merge processing can be conducted based on the JobID of another log (hook log, driver log or API log), of course.

As described above, according to the embodiment, the job information obtained from the client computer and the job information obtained from the printer are merged to be managed. Therefore, for example, the client computer can obtain the number of physical pages and the number of logical pages, and the printer can obtain the actual number of ejected sheets and the actual number of pages of ejected sheets in response to completion of actual printing. These pieces of information are managed by merging so that they can be compared with each other. Therefore, when an error, such as a paper jam, occurs in the printer and the number of ejected sheets does not correspond with the number of physical pages on the client computer side, the history of the job (for example, the job was adequately processed in the driver, but a jam error occurred in the printer) can be grasped. Furthermore, even if a different data processing is performed for each job, for example, even if the print processing is started with PDL data for a job and data is directly transmitted to the spooler for another job, since the job information is obtained in a plurality of steps, a more accurate log can be obtained.

OTHER EMBODIMENTS

The processings in the flowcharts in the drawings (FIGS. 11, 16, 19, 20 and the like) of this invention and the modules shown in FIGS. 1 and 18 are implemented by each computer according to a program externally installed. This invention can be applied to a case where a group of information including a program is supplied to the client computer from a storage medium, such as a CD-ROM, a flash memory and a FD, or from an external storage medium via a network.

Of course, the objects of this invention can also be attained in such a manner that a storage medium storing a program code of software for implementing the functions described in the embodiments is supplied to the system or apparatus, or the program code is downloaded into the system or apparatus from an external server (not shown), and the computer (or CPU or MPU) in the system or apparatus reads the program code and executes the same.

In this case, the program code read from the storage medium, such as the job account server program and job account client program, implements the novel functions according to this invention by itself, and the storage medium storing the program code is included in this invention. The storage medium for supplying the program code may be a floppy disk, a hard disk, an optical disk, a magneto-optical disk, a DVD, a CD-ROM, a magnetic tape, a nonvolatile memory card, a ROM and an EEPROM.

In addition, it goes without saying that this invention can be applied not only to a case where executing the program code read by the computer can implement the functions described in the above embodiments but also to a case where the OS (operating system) running on the computer or the like performs part or whole of the actual processings based on an instruction from the program code, whereby the functions described in the above embodiments are implemented. Furthermore, it goes without saying that this invention can be applied to a case where the program code transmitted from a predetermined external server (not shown) via a network or read from a storage medium is loaded into a feature expansion board inserted into the computer or a memory provided in a feature expansion unit connected to the computer, and then, the feature expansion board or the CPU or the like provided in the feature expansion unit performs part or whole of the actual processings based on an instruction from the program code, whereby the functions described in the above embodiments are implemented.

As described above, according to an aspect of this invention, since the job information is obtained from both the peripheral apparatus and the computer, the utilization of the peripheral apparatus can be correctly known. Since the job information is obtained from both the client computer and the image forming apparatus, the job information can be correctly grasped.

Furthermore, since arbitrary information can be added to the job information, highly flexible job accounting can be conducted.

What is claimed is:

1. A job management apparatus for managing job information, comprising:

a first obtaining unit configured to obtain, from a client apparatus via a network, first job log information corresponding to a job generated by the client apparatus through processing starting at a start time and ending at an end time and transmitted to an image processing apparatus at a transmission time, the first job log information including the start time and the end time, the end time including the transmission time;

a second obtaining unit configured to obtain, from the image processing apparatus via the network, second job log information corresponding to the job transmitted from the client apparatus and executed by the image processing apparatus through processing starting at a printing start time and ending at a printing end time, the second job log information including the printing start time and the printing end time, the printing end time including a sheet ejection time in the image processing apparatus; and a generation unit configured to generate a final log corresponding to the job based on the first job log information obtained by said first obtaining unit and the second job log information obtained by said second obtaining unit when identification information included in the first job log information is identical to identification information included in the second job log information, wherein said generation unit comprises:

a start time comparison unit configured to compare the start time included in the first job log information and the print start time included in the second job information;

a start time setting unit configured to set an earlier one of the start times compared by said start time comparison unit as a final start time of the job in the final log;

an end time comparison unit configured to compare the end time included in the first job information and the print end time included in the second job information; and an end time setting unit configured to set a later one of the end times compared by said end time comparison unit as a final end time of the job in the final log, wherein, when the identification information included in the first job log information is identical to the identification information included in the second job log information, it is determined that the first and second job log information is provided for the same job.

2. The job management apparatus according to claim 1, wherein the first job log information obtained by said first obtaining unit includes information indicating the number of logical pages, and the second job log information obtained by said second obtaining unit includes the number of sheets ejected from said image processing apparatus, or wherein the first job log information includes information on a destination to be charged for the job.

3. The job management apparatus according to claim 1, further comprising a display control unit configured to control a processing of displaying a combination of the final log generated by said generation unit and the identification information as a table on one display screen.

4. The job management apparatus according to claim 1, further comprising an output control unit configured to control a processing of outputting the final log generated by said generation unit to an external information processing apparatus via the network for managing the job information as job information in the external information processing apparatus.

5. A job management method carried out in a job management apparatus for managing job information, comprising:

obtaining first job information corresponding to a job generated by a client apparatus from the client apparatus through processing starting at a start time and ending at an end time and transmitted to an image processing apparatus at a transmission time, the first job log information including the start time and the end time, the end time including the transmission time;

obtaining second job information corresponding to the job transmitted from the client apparatus and executed by the image processing apparatus through processing starting at a printing start time and ending at a printing end time, the second job log information including the printing start time and the printing end time, the printing end time including a sheet ejection time in the image processing apparatus; and generating a final log corresponding to the job based on the obtained first job log information and the obtained second job log information when identification information included in the first job log information is identical to identification information included in the second job log information, wherein said generating step further comprises:

comparing the start time of the job included in the first job information and the printing start time included in the second job log information;

setting an earlier one of the compared start times as a final start time of the job in the final log;

comparing the end time included in the first job information and the printing end time included in the second job information; and setting a later one of the compared end times as a final end time of the job in the final log, wherein, when the identification information included in the first job log information is identical to the identification information included in the second job log information, it is determined that the first and second job log information is provided for the same job.

6. The job management method according to claim 5, wherein the obtained first job log information includes information indicating the number of logical pages, and the obtained second job log information includes the number of sheets ejected from said image processing apparatus, or wherein the first job log information includes information on a destination to be charged for the job.

7. The job management method according to claim 5, further comprising a display control step of controlling a processing of displaying a combination of the generated final log and the identification information as a table on one display screen.

8. The job management method according to claim 5, further comprising controlling a processing of outputting the generated final log to an external information processing apparatus via the network for the job information as job information in the external information processing apparatus.

9. A computer-readable storage medium on which is stored a control program that is executed by a job management apparatus for managing job information, said control program comprising:

obtaining first job information corresponding to a job generated by a client apparatus from the client apparatus through processing starting at a start time and ending at an end time and transmitted to an image processing apparatus at a transmission time, the first job log information including the start time and the end time, the end time including the transmission time;

obtaining second job information corresponding to the job transmitted from the client apparatus and executed by the image processing apparatus through processing starting at a printing start time and ending at a printing end time, the second job log information including the printing start time and the printing end time, the printing end time including a sheet ejection time in the image processing apparatus; and generating a final log corresponding to the job based on the obtained first job log information and the obtained second job log information when identification information included in the first job log information is identical to identification information included in the second job log information, wherein said generating step further comprises:

comparing the start time included in the first job log information and the printing start time included in the second job information;

setting an earlier one of the compared start times as a final start time in the final log;

comparing the end time included in the first job log information and the printing end time included in the second job log information; and setting a later one of the compared end times as a final end time of the job in the final log, wherein, when the identification information included in the first job log information is identical to the identification information included in the second job log information, it is determined that the first and second job log information is provided for the same job.

10. A network system including an image forming apparatus, a data processing apparatus that transfers data to the image forming apparatus to cause the apparatus to perform image processing for the data, and a job management apparatus that obtains job information from said image forming apparatus and said data processing apparatus, wherein said data processing apparatus comprises a transmission control unit configured to control a processing of transmitting the job information generated therein, and said job management apparatus comprises:

a first obtaining unit configured to obtain first job log information corresponding to a job generated by the data processing apparatus from the data processing apparatus through processing starting at a start time and ending at an end time and transmitted to the image forming apparatus at a transmission time, the first job log information including the start time and the end time, the end time including the transmission time;

a second obtaining unit configured to obtain, from the image forming apparatus via the network, second job log information corresponding to the job transmitted from the data processing apparatus and executed by the image forming apparatus through processing starting at a printing start time and ending at a printing end time, the second job log information including the printing start time and the printing end time, the printing end time including a sheet ejection time in the image forming apparatus; and a generation unit configured to generate a final log corresponding to the job based on the first job log information obtained by said first obtaining unit and the second job log information obtained by the second obtaining unit when identification information included in the first job log information is identical to identification information included in the second job log information, wherein said generation unit comprises:

a start time comparison unit configured to compare the start time included in the first job log information and the printing start time included in the second job log information;

a start time setting unit configured to set an earlier one of the start times compared by said start time comparison unit as a final start time of the job in the final log;

an end time comparison unit configured to compare the end time included in the first job log information and the printing end time included in the second job log information; and an end time setting unit configured to set a later one of the end times compared by said end time comparison unit as a final end time of the job in the final log, wherein, when the identification information included in the first job log information is identical to the identification information included in the second job log information, it is determined that the first and second job log information is provided for the same job.

11. The job management apparatus according to claim 1, wherein the first job log information includes a document name corresponding to the job and the identification information, and the second job log information includes the identification information which is set for an item for which a document name is to be set as setting contents, and wherein said generation unit changes the identification information included in the second job log information to the document name included in the first job log information.

12. The job management method according to claim 5, wherein the first job log information includes a document name corresponding to the job and the identification information, and the second job log information includes the identification information which is set for an item for which a document name is to be set as setting contents, and wherein said generating step changes the identification information included in the second job log information to the document name included in the first job log information.

13. A job management apparatus for managing job information, comprising:

a first obtaining unit configured to obtain, from a client apparatus via a network, first job log information corresponding to a job generated by the client apparatus and transmitted to an image processing apparatus, the first job log information including a document name corresponding to the job and identification information which is set for an item for which a document name is to be set as setting contents, the identification information being manageable in the image processing apparatus and different from the document name;

a second obtaining unit configured to obtain, from the image processing apparatus via the network, second job log information corresponding to the job transmitted from the client apparatus and executed by the image processing apparatus, the second job log information including identification information which is set for an item for which a document name is to be set as setting contents; and a generation unit configured to generate a final log corresponding to the job based on the first job log information obtained by said first obtaining unit and the second job log information obtained by said second obtaining unit when the identification information included in the first job log information is identical to the identification information included in the second job log information, wherein said generation unit changes the identification information included in the second job log information to the document name included in the first job log information, and wherein, when the identification information included in the first job log information is identical to the identification information included in the second job log information, it is determined that the first and second job log information is provided for the same job.

14. The job management apparatus according to claim 13, further comprising a third obtaining unit configured to obtain user information from the client apparatus, wherein said generation unit merges the user information obtained by said third obtaining unit and final log.

15. The job management apparatus according to claim 13, wherein the identification information is generated by the client apparatus and has the number of characters manageable both in the client apparatus and in the image processing apparatus.

16. A job management method carried out in a job management apparatus for managing job information, comprising:

obtaining, from a client apparatus via a network, first job log information corresponding to a job transmitted from the client apparatus and executed by an image processing apparatus, the first job log information including a document name corresponding to the job and identification information which is set for an item for which a document name is to be set as setting contents, the identification information being manageable in the image processing apparatus and different from the document name;

obtaining, from the image processing apparatus via the network, second job log information corresponding to the job transmitted from the client apparatus and executed by the image processing apparatus, the second job log information including identification information which is set for an item for which a document name is to be set as setting contents; and generating a final log corresponding to the job based on the obtained first job log information and the obtained second job log information when the identification information included in the first job log information is identical to the identification information included in the second job log information, wherein said generating step comprises changing the identification information included in the second job log information to the document name included in the first job log information, and wherein, when the identification information included in the first job log information is identical to the identification information included in the second job log information, it is determined that the first and second job log information is provided for the same job.

17. The job management method according to claim 16, further comprising obtaining user information from the client apparatus, wherein said generating step comprises merging the obtained user information and the final log.

18. The job management method according to claim 16, wherein the identification information is generated by the client apparatus and has the number of characters manageable both in the client apparatus and in the image processing apparatus.

19. A computer-readable storage medium on which is stored a computer program that implements the method according to claim 16.

* * * * *